June 6, 1933.    E. D. COOK    1,913,191
ELECTRICAL DISTRIBUTION SYSTEM
Filed March 20, 1930
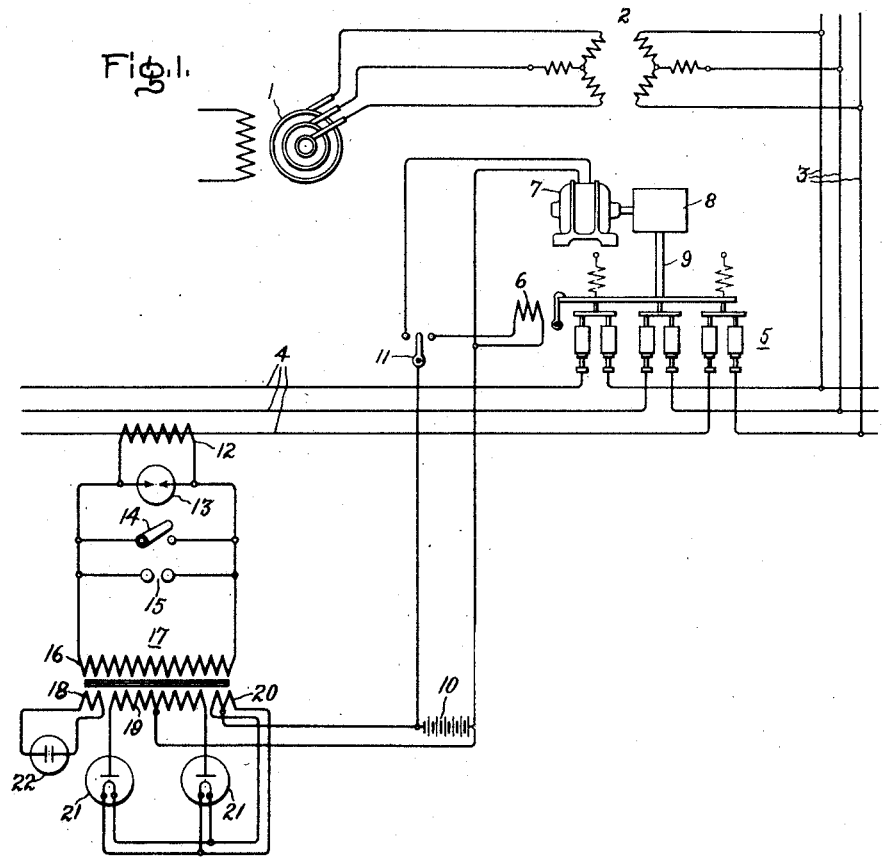
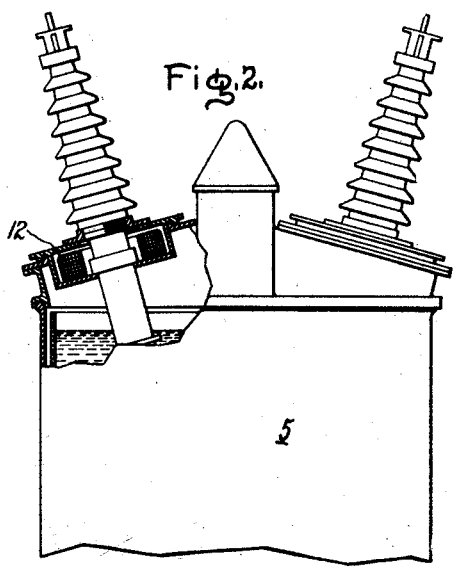
Inventor:
Ellsworth D. Cook,
by Charles E. Tullar
His Attorney.

Patented June 6, 1933

1,913,191

UNITED STATES PATENT OFFICE

ELLSWORTH D. COOK, OF FLUSHING, NEW YORK, ASSIGNOR TO GENERAL ELECTRIC COMPANY, A CORPORATION OF NEW YORK

ELECTRICAL DISTRIBUTION SYSTEM

Application filed March 20, 1930. Serial No. 437,538.

My invention relates to electrical distribution systems and particularly to systems for the transformation of relatively small increments of electrical energy.

It has long been a seeming paradox that although ordinary high voltage transmission lines represent a relatively large flow of energy, it has been practically impossible to tap such lines in order to supply relatively small power loads therefrom at a reasonable cost. Typical examples of such loads are isolated switching stations which require a small amount of energy for operating the oil circuit breakers, and airplane beacons by which pilots may follow the route of a transmission line. The reasons for this situation are due fundamentally to the fact that transmission voltages must be high in order that the conductor size, and consequently the cost of the line, be kept small enough for economical operation. As a result step down transformers for transforming a small amount of tapped energy to the voltage for which most load devices are rated must be heavily insulated. They are, therefore, so expensive as to practically preclude the feasibility of their use in this connection.

Another difficulty is that step down transformers, whether connected between line conductors or from a conductor to ground provide a potential source of short circuits or grounds thereby producing a possible weak spot in the line which tends to jeopardize the continuity of service and increase the operating expenses of the line, all of which create a situation that the operating companies do not view with favor.

As a way of obviating these difficulties, I associate with a transmission line means, such as a current transformer, for producing a voltage which is proportional to the current flow in one of the conductors of the line combined with a transformer for securing the proper load voltage and a regulating means for preventing the load voltage from varying as the line current varies.

It is an object of my invention to provide simple and comparatively cheap means for obtaining relatively small powers from high voltage transmission lines.

It is another object of my invention to provide voltage regulating means associated with means for obtaining small powers from high voltage transmission lines.

My invention will be better understood from the following description taken in connection with the accompanying drawing, and its scope will be pointed out in the appended claims.

In the accompanying drawing, Fig. 1 illustrates diagrammatically a preferred embodiment of my invention, while Fig. 2 is a detail view, partly in section, of an oil circuit breaker and bushing type current transformer.

Referring now to Fig. 1 of the accompanying drawing, 1 represents an alternating current generating station which is connected to a high voltage transmission line 3 through a step up transformer 2. It is to be understood that station 1 is representative of generating stations in general and that therefore its alternators are connected to the usual voltage regulators for maintaining constant voltage on the transmission line. Connected to line 3 through an oil circuit breaker 5 is a branch transmission line 4 which is to be tapped. Oil circuit breaker 5, which may be of any well known type, includes a tripping coil 6 and a motor 7 which is connected through suitable operating mechanisms 8 and 9 to the switch for closing purposes. Tripping coil 6 and motor 7 are connected through suitable circuit controlling means 11 to a storage battery 10 which supplies the energy for their operation.

Associated with one of the conductors of line 4 is a current transformer 12, which is preferably of the bushing type and which in practice forms part of the circuit breaker construction, as shown in Fig. 2. Connected across the terminals of the secondary winding of transformer 12 is a vacuum gap lightning arrester 13, a short circuiting switch 14, a sphere gap 15, and the primary winding 16 of a potential or distribution transformer 17 having a plurality of secondary windings 18, 19 and 20 respectively. Connected across secondary winding 18 is a voltage regulating device, shown as a glow tube 22, while associated with secondary windings 19 and 20 is a rectifier which in the embodiment illustrated comprises a pair of two-element electron discharge devices 21. These discharge devices are connected in a well known manner with their plate circuits across portions of secondary winding 19 and their filaments across winding 20. Battery 10 is connected to the mid points of windings 19 and 20 respectively.

The operation of my system is as follows. Due to the current flow in line 4 current transformer 12 will have induced in its secondary winding a voltage which is proportional to this current, but as this transformer is of standard and relatively cheap construction this voltage for the normal range of line currents will not be suitable for application to most load devices. It is therefore transformed through the transformer 17 to the proper voltage, which in the illustration shown will be the proper charging voltage for battery 10.

It should be noted that although I have shown but a single current transformer and connected apparatus my invention is not so limited and that if the power obtainable from a single transformer is insufficient it will be obvious to those skilled in the art that the other line conductors may be tapped by similar apparatus to supply additional power, without departing from my invention in its broader aspects.

Glow tube 22 which usually comprises a pair of separated electrodes in a rarefied neon atmosphere has a predetermined resistance to the flow of current through it up to a certain predetermined maximum impressed voltage beyond which the tube exhibits a zero volt-ampere characteristic, that is to say, after a critical voltage has been attained there takes place in the tube a cumulative ionization which allows a wide range of currents to flow through it without an appreciable change in voltage across its terminals. Consequently, if the current through line 4 rises to a point at which the voltage of the secondary winding of transformer 12 impresses too high a voltage on the primary winding of transformer 17, the tendency for the voltages of the secondary windings of this transformer to rise will be checked through the action of tube 22 on the winding 18 for any tendency for the voltage of the secondary windings of transformer 17 to rise will manifest itself in an increased current flow through secondary winding 18 and tube 22.

The combination of standard current and potential transformers results in a comparatively inexpensive system for obtaining small powers from high voltage transmission lines. Furthermore, as current transformer 12 comprises an inductive coupling with the transmission line 4, the necessity for expensive insulation, such as in cases where a step down transformer is used for tapping a transmission line, is obviated.

Protective devices 13 and 14 are provided in order to prevent damage to transformer 17 from lightning, short circuits, or other causes producing current surges in line 4. Switch 14 serves as an added protection and also as a means for stopping the flow of power to the load.

While I have shown and described a particular embodiment of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In combination, a high voltage alternating current transmission line, a current transformer having its primary winding connected in one of the conductors of said line, the secondary winding of said current transformer being connected to the primary winding of a transformer having a plurality of secondary windings, a load circuit connected to one of said secondary windings and a voltage limiting regulating device connected across another of said secondary windings.

2. In combination, a high voltage overhead polyphase transmission line, means for obtaining relatively small powers therefrom comprising, a transformer having its primary winding in series with one of the conductors of said line, a second transformer having a plurality of secondary windings, means connecting the secondary winding of said first transformer to the primary winding of said second transformer, overvoltage protective means connected across the secondary winding of said first transformer, a load circuit connected to one of the secondary windings of said second transformer and a voltage limiting electric discharge device connected across another of said secondary windings.

3. In combination, a high voltage alternating current overhead transmission line, a winding linking one of the conductors of said line, a potential transformer having a primary winding and a plurality of secondary windings, means connecting said linking winding and said primary winding together, overvoltage protective devices connected across said linking winding, a rectifying device associated with one of said secondary windings, a load connected to said rectifier, and a device having a substantially zero volt-ampere characteristic connected across another of said secondary windings.

4. In combination, means for generating a relatively large amount of alternating current electrical energy at any convenient voltage, means for transforming said generated energy into energy at a relatively high voltage, a transmission line connected to said means, an isolated load device requiring a relatively insignificant amount of low voltage electrical energy adjacent said line, a current transformer having its primary winding connected in one of the conductors of said line, a potential transformer having a plurality of secondary windings, means connecting a plurality of overvoltage protective devices and the primary winding of said potential winding across the secondary winding of said current transformer, a regulating glow tube connected across one of the secondary windings of said potential transformer and a means connecting said load device to the remaining secondary windings of said potential transformer.

5. Means for energizing isolated apparatus associated with a high voltage alternating current power transmission line from said line comprising a current transformer having its primary winding in one of the conductors of said line, a distribution transformer having a plurality of secondary windings, means connecting an overvoltage protective device and the primary winding of said distribution transformer across the secondary winding of said current transformer, a voltage limiting glow tube connected across one of the secondary windings of said potential transformer, and rectifying means interposed between the remaining secondary windings of said potential transformer and said isolated apparatus.

In witness whereof, I have hereunto set my hand this 12th day of March 1930.

ELLSWORTH D. COOK.